United States Patent
Andersson et al.

(10) Patent No.: US 10,070,618 B2
(45) Date of Patent: Sep. 11, 2018

(54) MILK CONDUIT, A MILK CONDUIT DEVICE, A MILK-RECEIVING MEMBER AND A MILKING MEMBER

(71) Applicant: DELAVAL HOLDING AB, Tumba (SE)

(72) Inventors: Anna Andersson, Tumba (SE); Fredrik Palmer, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 447 days.

(21) Appl. No.: 14/653,290

(22) PCT Filed: Dec. 18, 2013

(86) PCT No.: PCT/SE2013/051556
§ 371 (c)(1),
(2) Date: Jun. 18, 2015

(87) PCT Pub. No.: WO2014/098751
PCT Pub. Date: Jun. 26, 2014

(65) Prior Publication Data
US 2016/0007559 A1    Jan. 14, 2016

Related U.S. Application Data

(60) Provisional application No. 61/739,110, filed on Dec. 19, 2012.

(30) Foreign Application Priority Data

Dec. 19, 2012 (SE) ..................... 1251453

(51) Int. Cl.
*A01J 5/04* (2006.01)

(52) U.S. Cl.
CPC ............. *A01J 5/041* (2013.01); *A01J 5/044* (2013.01)

(58) Field of Classification Search
CPC ...... A01J 5/02; A01J 5/04; A01J 5/041; A01J 5/042; A01J 5/044; A01J 5/045; A01J 5/047; A01J 5/048
(Continued)

(56) References Cited

U.S. PATENT DOCUMENTS

| 4,076,285 A | 2/1978 | Martinez |
| 4,537,152 A | 8/1985 | Thompson |

(Continued)

FOREIGN PATENT DOCUMENTS

| CN | 101686647 | 3/2010 |
| CN | 202182273 | 4/2012 |

(Continued)

OTHER PUBLICATIONS

Chinese Office Action dated Jul. 22, 2016; Application No. 201380060384.X.

(Continued)

*Primary Examiner* — Monica L Williams
*Assistant Examiner* — Ebony E Evans
(74) *Attorney, Agent, or Firm* — Young & Thompson

(57) ABSTRACT

The invention is directed to a milk conduit, a milk conduit device, a milk-receiving member and a milking member, wherein a milk conduit includes a first end portion for connection to a milk-receiving member, the first end portion including an inner sleeve section made of a first material and an outer sleeve section joined to the inner sleeve section and made of a second material, which is more rigid than the first material, and the outer sleeve section includes an outer peripheral surface and at least one projection extending outwardly from the outer peripheral surface, the projection (Continued)

having a peripheral extension of less than 180°, and engaged by a coupling member on the milk-receiving member.

10 Claims, 4 Drawing Sheets

(58) Field of Classification Search
USPC .................................................. 119/14.46
See application file for complete search history.

(56) References Cited

U.S. PATENT DOCUMENTS

| | | | | |
|---|---|---|---|---|
| 7,827,933 | B2* | 11/2010 | Van Den Berg | A01J 5/007 119/14.51 |
| 8,671,886 | B2 | 3/2014 | Auburger et al. | |
| 8,833,300 | B2* | 9/2014 | Auburger | A01J 5/044 119/14.51 |
| 2001/0039055 | A1* | 11/2001 | Miefalk | G01N 33/04 436/150 |
| 2008/0289579 | A1* | 11/2008 | Auburger | A01J 5/044 119/14.51 |
| 2009/0050062 | A1* | 2/2009 | Auburger | A01J 5/044 119/14.51 |
| 2010/0089325 | A1* | 4/2010 | Auburger | A01J 5/044 119/14.18 |
| 2010/0126422 | A1* | 5/2010 | Auburger | A01J 5/06 119/14.47 |

FOREIGN PATENT DOCUMENTS

| | | |
|---|---|---|
| DE | 10 2005 040275 A1 | 3/2007 |
| EP | 1588608 A1 | 10/2005 |
| EP | 1 872 653 A1 | 1/2008 |
| EP | 42924 A1 | 1/2008 |
| JP | 05055480 A | 3/1993 |
| JP | 06055140 A | 3/1994 |
| JP | 2005304502 A | 11/2005 |
| RU | 44 455 U1 | 3/2005 |
| RU | 2 449 535 C2 | 5/2012 |
| SE | 58230 C1 | 6/1920 |
| SE | 56240 C1 | 10/1921 |
| SU | 1507267 A1 | 9/1989 |
| WO | 2004110134 | 12/2004 |
| WO | 2007022950 A2 | 3/2007 |
| WO | 2009/147369 A1 | 12/2009 |
| WO | 2010025877 | 3/2010 |

OTHER PUBLICATIONS

International-Type Search Report, dated May 29, 2013, from corresponding PCT application.
International Search Report, dated Apr. 8, 2014, from corresponding PCT application.
Supplementary International Search Report, dated Aug. 29, 2014, from corresponding PCT application.
Oct. 31, 2017, JP communication issued for related JP application No. 2015-549317.

* cited by examiner

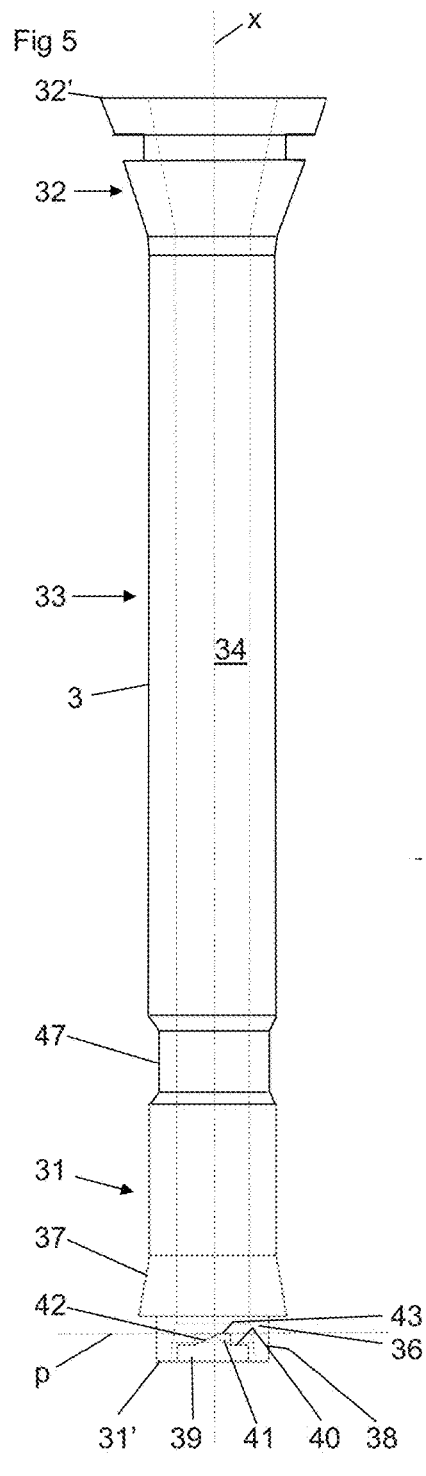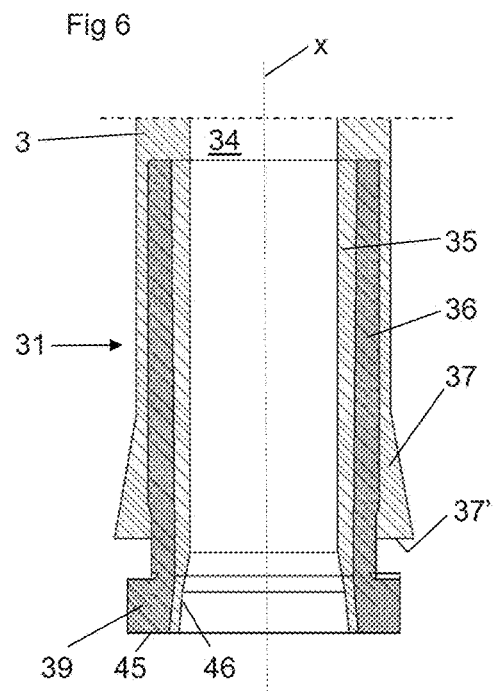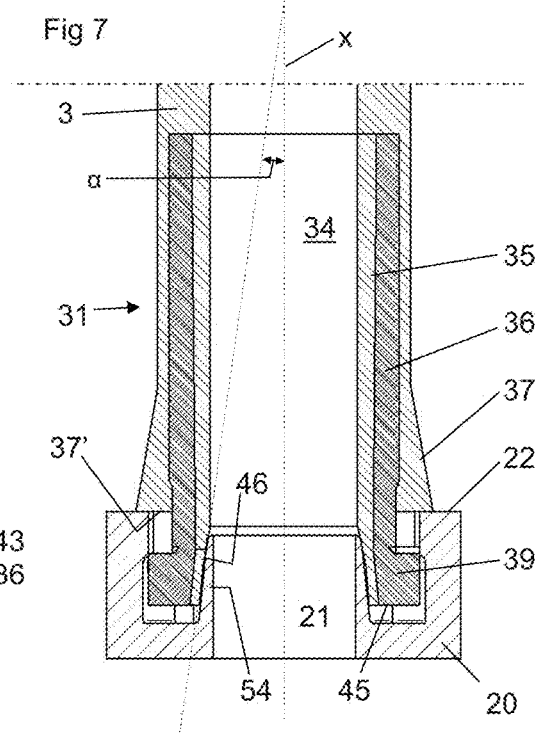

MILK CONDUIT, A MILK CONDUIT DEVICE, A MILK-RECEIVING MEMBER AND A MILKING MEMBER

THE FIELD OF THE INVENTION

The present invention refers to a milk conduit. Especially, the present invention refers to a short milk conduit of a milking member including a claw and a number of teatcups. Such a short milk conduit is disclosed in US 2009/0050062. The milk conduit may for instance form a separate short milk conduit to be attached to a teatcup liner and/or a teatcup, or a short milk conduit forming an integrated part of a teatcup liner. The present invention also refers to a milk conduit device. Furthermore, the present invention refers to a milk-receiving member. Still further the present invention refers to a milking member.

PRIOR ART

US 2009/0050062 discloses a plurality of various short milk conduits. One variant comprises a first end portion defining a first end and configured to be connected to a milk-receiving member, and a second end portion defining a second end and configured to be connected to a teatcup. An intermediate conduit portion extends between the first end portion and the second end portion. The milk conduit defines a milk channel extending through the first end portion, the conduit portion and the second end portion. The first end portion comprises an inner sleeve section made of a first material and an outer sleeve section joined to the inner sleeve section and made of a second material. The second material is more rigid than the first material. A similar short milk conduit is disclosed in US 2010/0089325.

The outer sleeve section of the known short milk conduit is angled to provide a permanently bent portion of the short milk conduit. A disadvantage of the known short milk conduit is the difficulty to attach it to the milk-receiving member. The first end portion is not configured to permit a quick and reliable attachment of the short milk conduit to the milk-receiving member, such as a claw.

SUMMARY OF THE INVENTION

The object of the present invention is to provide a milk conduit that permits a quick and reliable attachment to a milk-receiving member such as a claw.

This object is achieved by the milk conduit initially defined, which is characterised in that the outer sleeve section comprises an outer peripheral surface and at least one projection extending outwardly from the outer peripheral surface, said projection having a peripheral extension of less than 180°, wherein said projection is configured to be engaged by a coupling member on the milk-receiving member. Such an outer sleeve section permits turning of the milk conduit less than half a round in the coupling member. The milk conduit may thus be quickly attached to the milk-receiving member. The projection also enables achievement of a reliable and tight connection of the milk conduit to the milk-receiving member. Especially, the outer sleeve section with the projection together with the coupling member may form a so called bayonet coupling. Advantageously, the peripheral extension is equal to or less than 90°, or slightly less than 90°.

According to an embodiment of the invention, the outer sleeve section comprises two opposite projections extending outwardly from the outer peripheral surface. Two projections, each for instance having a peripheral extension of 90° or slightly less than 90°, permits a reliable attachment by turning the outer sleeve section a quarter, or substantially a quarter, of a round. Furthermore, the projections will have a total size ensuring that the outer sleeve section is securely held in the coupling member. Advantageously, the peripheral extension is equal to or more than 45°.

According to a further embodiment of the invention, said projection comprises an upper side and a raised portion, which extends from the upper side and which has an inclined ramp. The provision of such an inclined ramp permits two flanges of the coupling member to slide on the inclined ramp, thereby tightening the second end portion against the coupling member of the milk-receiving member.

According to a further embodiment of the invention, the raised portion has a top surface, which is provided adjacent to inclined ramp. The top surface may be engaged in a recess of a respective one of the two flanges of the coupling member, thereby permitting locking of the projections in the coupling member, when the outer sleeve section has been turned to an end position. Advantageously, the milk conduit, in a rest state, extends along a centre axis. The top surface may then lie in a radial plane with respect to the centre axis.

According to a further embodiment of the invention, the milk conduit comprises a conduit portion extending from the first end portion. Advantageously, the outer sleeve section may have a straight extension and extend to the conduit portion. The outer sleeve section, which is made of the second material will thus prevent bending of the milk conduit. Instead the outer sleeve section may define a position, above which the milk conduit may bend due to the weight of the teatcup provided at the first end portion.

According to a further embodiment of the invention, the conduit portion is made of the first material. Consequently, the conduit portion thus may permit said bending of the milk conduit, especially in the proximity of the outer sleeve section, in order to close the milk channel.

According to further embodiments of the invention, the milk conduit defines a milk channel extending through the first end portion and the conduit portion, wherein the milk channel of the first end portion has a tapering shape from the first end to a position beyond the projection, and wherein the tapering shape is configured to be sealingly engaged by a correspondingly tapering centre nipple of the coupling member. Such a tapering shape in cooperation with the tapering centre nipple secures a tight connection between the milk conduit and the milk-receiving member.

According to a further embodiment of the invention, the first end is defined by a first end surface, wherein the projection has a lower surface located above or coinciding with the first end surface. Advantageously, the first end surface is perpendicular to the centre axis.

According to a further embodiment of the invention, the coupling member comprises two at least one flange, extending inwardly, wherein the projection is configured to cooperate with the flange and to be turned to a position at which each of the projection is engaged by the flange. Advantageously, the raised portion of the projection may be engaged by a recess of the flange.

According to a further embodiment of the invention, the outer sleeve section comprises at least one locking flange extending outwardly from the outer peripheral surface, and being provided axially beside and at a distance from of the projection. Such a locking flange may have an outer surface being parallel with the centre axis and having an outwardly projecting raised portion to be received in a depression of a recess in said one flange of the coupling member thereby locking the outer sleeve section in the turned position.

According to a further embodiment of the invention, said one flange of the coupling member has a thickness in an axial direction, which is equal to said distance.

The object is also achieved by a milk-receiving member initially defined, which is characterised in that each coupling member is attached to the upper part and comprises at least one flange surrounding the respective inlet passage and extending inwardly towards the inlet passage, and that the flange is configured to cooperate with a projection, which extends outwardly from an outer peripheral surface of a milk conduit and has a peripheral extension of less than 180°, so that the milk conduit is attached to the coupling member by being turned to a position at which the projection is engaged by the flange. Such a coupling member permits easy attachment of the milk conduit by turning of the milk conduit less than half a round in the coupling member. The milk conduit may thus be quickly attached to the milk-receiving member. The at least one flange also enables achievement of a reliable and tight connection of the milk conduit to the milk-receiving member. Especially, the coupling member with the at least one flange may together with the outer sleeve section with the projection form a so called bayonet coupling.

According to a further embodiment of the invention, each coupling member comprises tapering centre nipple, which is configured to be received by a tapering shape of a milk channel of the milk conduit. Such a tapering nipple may form a seal together with the tapering shape of the milk channel.

According to a further embodiment of the invention, each coupling member is integrated in the claw by being manufactured in one piece together with the upper part.

According to a further embodiment of the invention, each coupling member is attached to the upper part of the claw.

Furthermore, the object is achieved by a milking member comprising a claw with a number of coupling members and a corresponding number of milk conduits as defined above, each milk conduit being attached to the respective one of the coupling members.

BRIEF DESCRIPTION OF THE DRAWINGS

The present invention is now to be explained more closely through a description of various embodiments and with reference to the drawings attached hereto.

FIG. 5 discloses a side view of a short milk conduit according to a first embodiment of the invention.

FIG. 6 discloses a sectional view of a first end portion of the short milk conduit in FIG. 5.

FIG. 7 discloses a sectional view of the first end portion of the claw mounted in the coupling member.

DETAILED DESCRIPTION OF THE DRAWINGS

Figure 1:
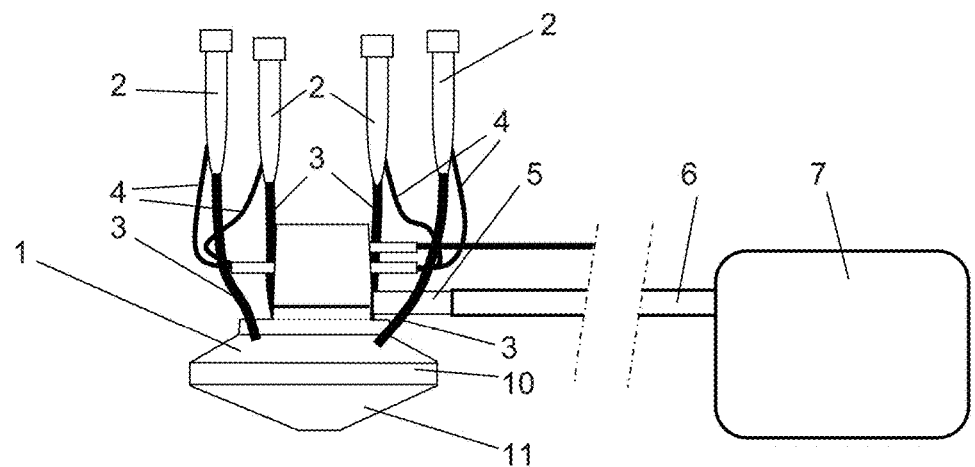
FIG. 1 discloses a schematic view of a milking member connected to a milk-storing member.

FIG. 1 discloses a milking member comprising a milk-receiving member in the form of a schematically disclosed claw 1, or teatcup claw, and four teatcups 2 connected to the claw 1 via a respective milk conduit 3, or short milk conduit. Each teatcup 2 is configured to be attached to a respective teat of an animal to be milked during a milking operation. The milking member also comprises four short pulse conduits 4, one for each teatcup 2.

The claw 1 comprises an outlet nipple 5 configured for being connected to a long milk conduit 6 for the discharge of milk from an inner space of the claw 1 to a milk-storing member 7 of a milking machine.

Figure 2:
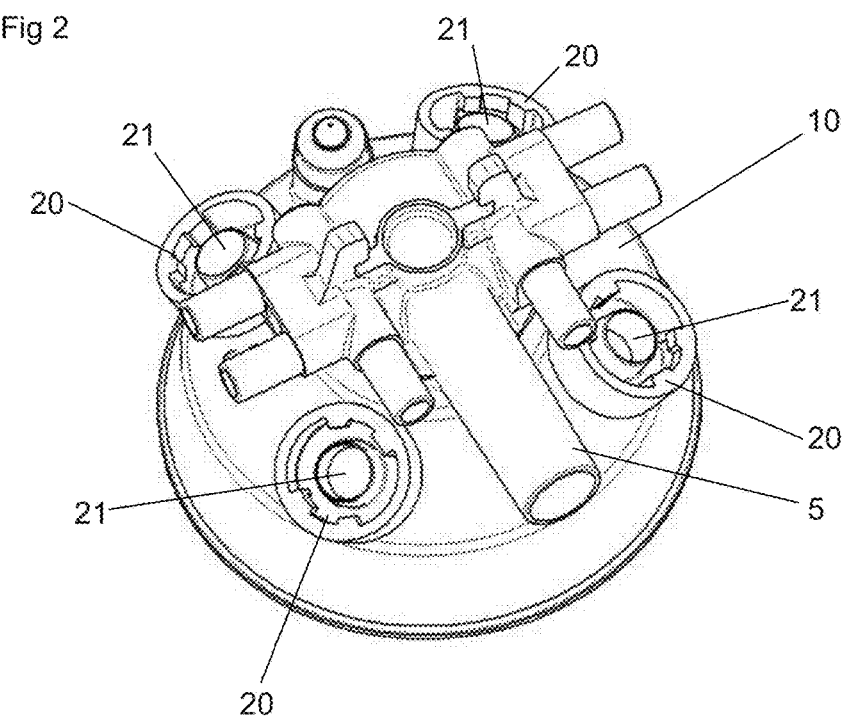
FIG. 2 discloses a perspective view from above of a claw of the milking member in FIG. 1.

The claw 1 comprises an enclosure having an upper part 10, see FIG. 2, and a lower part 11. The enclosure encloses said inner space for receiving milk and conveying a milk flow of the milk during a milking operation to the outlet nipple 5 and the long milk conduit 6. The lower part 11 is detachably connected to the upper part 10 by means of a suitable coupling, such as a bayonet coupling.

Figure 3:
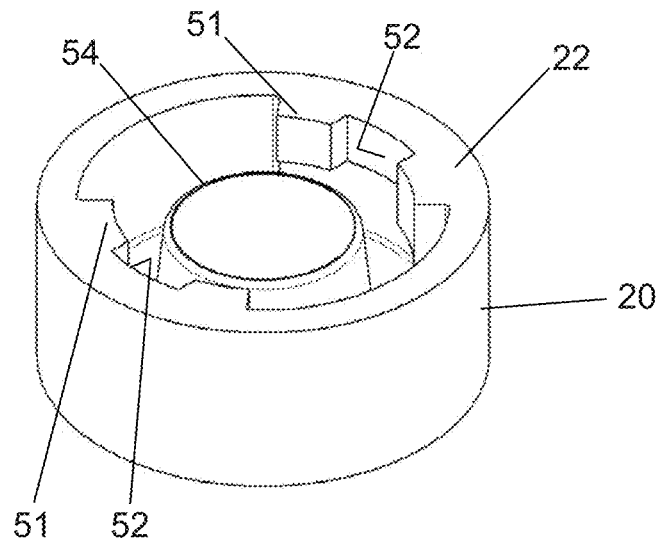
FIG. 3 discloses a perspective view of a coupling member of the claw.

The claw 1 comprises a plurality of, in the embodiments disclosed four, coupling members 20, see FIGS. 2 and 3, configured for receiving a respective one of the milk conduits 3. Each coupling member 20 forms, together with a hole through the upper part 10, an inlet passage 21 through the upper part 10. The inlet passage 21 permits feeding of milk to said inner space from the respective teatcup 2 and the respective teat.

The coupling members 20 may be formed as separate pieces, which are attached, or permanently attached, to the upper part 10. In the embodiments disclosed, the coupling members 20 project from an outer surface of the upper part 10. The coupling members 20 may be attached by a suitable adhesive, by mean of a melting operation etc.

The coupling member 20 may also be integrated in, or may form an integrated part of, the claw 1, i.e. in this case in the upper part 10, and thus manufactured in one piece together with the claw 1 or the upper part 10. The whole upper part 10 together with the coupling members 20 may then be manufactured by means of a moulding process, in particular in one moulding step. It is, however, also possible to pre-manufacture the coupling members, which then are placed in a mould to be moulded in one piece together with the upper part 10.

It is also possible, irrespective of whether the coupling members 20 are integrated or attached, to provide the coupling members 20 to be depressed into the upper part 10. In this case an upper end surface 22 of the coupling members 20 may be at the same level as the surrounding outer surface, or project slightly from the upper surface. The upper end surface 22 of the coupling members 20 may also lie below the outer surface of the upper part 10.

Each milk conduit 3 is now to be described more closely with reference to FIGS. 5-8.

The milk conduit 3 comprises a first end portion 31 defining a first end 31' and configured to be connected to the coupling member 20. The milk conduit 3 extends along a centre axis x, at least in a rest state when no external forces act on the milk conduit 3.

The milk conduit 3 also comprises a second portion 32 defining a second end 32' and configured to be connected to the teatcup 2. Alternatively, the second end portion may comprise a liner portion to be attached to the teat of the animal, i.e. the milk conduit 3, or the short milk conduit, is an integrated part of the teatcup liner.

The milk conduit 2 also comprises an intermediate conduit portion 33 which extends between the first end portion 31 and the second end portion 32.

The milk conduit 3 defines a milk channel 34 extending through at least the first end portion 31 and the conduit portion 33. The milk channel 34 may also extend through, or through a part of, the second end portion 32.

The first end portion 31 comprises an inner sleeve section 35 made of a first material, and an outer sleeve section 36 made of a second material.

Advantageously, the outer sleeve section 36 and the inner sleeve section 35 are integrally joined to the milk conduit 3, in particular in the first end portion 31 of the milk conduit 3, to form an integrated structure. Thus, the outer sleeve section 36 may be joined to the inner sleeve section 35, for instance through vulcanisation or local melting of the second material of the outer sleeve section 36 and of the first material of the inner sleeve section 35.

The second material is more rigid than the first material. The second material could for instance be or comprise a polymer material, such as polypropene. The first material could be or comprise rubber, silicone rubber, natural rubber, thermo plastic elastomers, TPE, etc.

The conduit portion 33 is also preferably made of the first material. Thus the inner sleeve section 35 is an integrated part of the milk conduit 3, such as an integrated part of one and the same first material.

Also the second end portion 32 may be made of the first material.

In the embodiments disclosed, the first end portion 31 also comprises a cover section 37 provided outside and joined to the outer sleeve section 36, for instance through vulcanisation. As can be seen in FIGS. 6 and 7, the cover section 37 extends to a lower end surface 37', which may be perpendicular to the centre axis x. The cover section 37 extends along only a part of the outer sleeve section 36, i.e. not to the first end 31'. The cover section 37 is made of the first material. Preferably, the cover section 37 is integral with and made of the same first material as the inner sleeve section 35 as can be seen in FIGS. 6 and 7.

The outer sleeve section 36 comprises an outer peripheral surface 38. The outer peripheral surface 38 extends around the outer sleeve section 36. In particular, the outer peripheral surface 38 may be circular cylindrical.

Furthermore, the outer sleeve section 36 comprises at least one, in the embodiments disclosed, two, projections 39 extending outwardly from the outer peripheral surface 38 and from the centre axis x. Each of the projections 39 has a peripheral extension, i.e. an extension in a peripheral direction. The peripheral extension is preferably less than 180°, and preferably equal to or more than 45°, with respect to the centre axis x. In the embodiments disclosed, the peripheral extension of the two projections 39 is 90° or approximately 90°. The projections 39 are configured to be engaged by one of the coupling members 20 as illustrated in FIG. 7.

Figure 8:
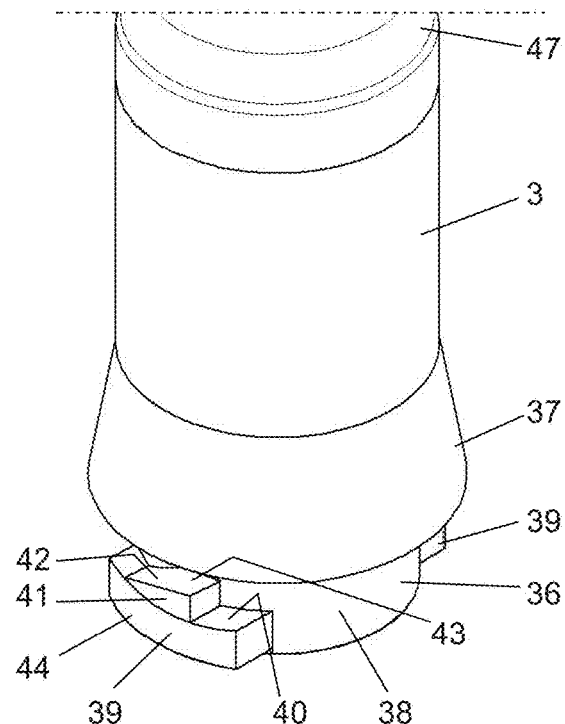
FIG. 8 shows a perspective view of the first end portion the milk conduit in FIG. 5.

Each projection 39 comprises an upper side 40 and a raised portion 41, which extends from the upper side 40 and which has an inclined ramp 42, see FIGS. 5 and 8. The raised portion 41 also has a top surface 43 which is provided adjacent to the inclined ramp 42. In the first embodiment, the top surface 43 extends along or lies in a radial plane p with respect to the centre axis x. It is to be noted that the top surface 43 may have another inclination, for instance the same inclination as the ramp.

Furthermore, each projection 39 may comprise an outer surface 44 being parallel to the outer peripheral surface 38.

The first end 31' is defined by a first end surface 45. Each projection 39 has a lower surface which may be coincide with the first end surface 45 as can be seen in FIGS. 6 and 7. It is to be noted that the lower surface of each projection 39, or possibly some of the projections 39, may be located above the first end surface 45, i.e. more closely to the conduit portion 33.

The first end surface 45 may preferably be parallel to the radial plane p, i.e. perpendicular to the centre axis x.

The milk channel 34 of the first end portion 31 has a tapering shape 46. The tapering shape 46 extends from the first end 31', or from the first end surface 45, to a position beyond the projections 39, see especially FIG. 6. The tapering shape 46 is formed in the inner sleeve section 35. The tapering shape 46 extends to a position above, or slightly above, the projections 39, and below, or slightly below, the cover section 37 as can been seen in FIGS. 6 and 7.

Figure 4:
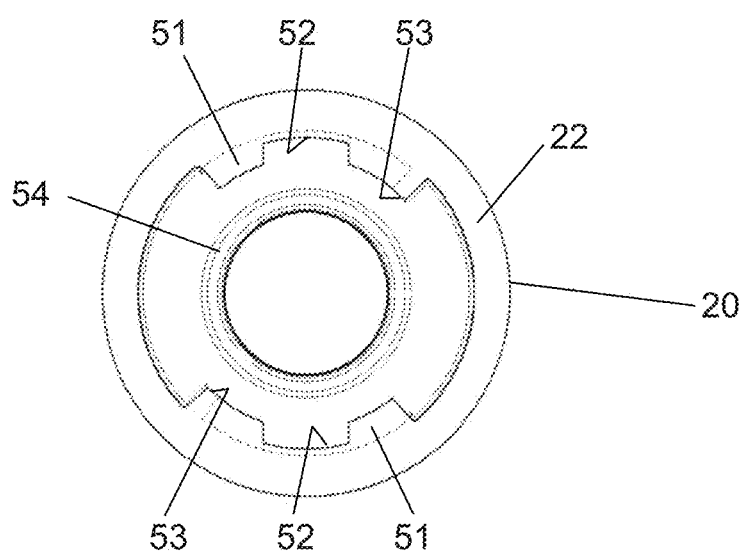
FIG. 4 discloses a plan view of the coupling member in FIG. 3.

The coupling member 20 of the first embodiment, see FIGS. 3, 4 and 7, comprises two opposite flanges 51, which extend inwardly towards each other. The projections 39 are configured to cooperate with a respective one of the flanges 51 and to be turned to a position at which each of the projections 39 is engaged by a respective one of the flanges 51. In the first embodiment, the raised portion 41 is engaged by a recess 52 of the respective flange 51. Possibly, the upper side 40 on both sides of the raised portion 41 abuts a lower side of the flange 51. Each of the flanges 51 also comprises a shoulder 53 defining an abutment for the projection 39, and thus an end position for the turning of the milk conduit 3 and the outer sleeve section 36.

The outer sleeve section 36 has a straight extension and extends to the intermediate conduit portion 33. The outer sleeve section 36 defines an upper annular end lying in a plane being perpendicular to the centre axis x, and thus parallel to the radial plane p. However, it is to be noted that the upper annular end of the outer sleeve section 36 may be inclined with respect to the centre axis x, for instance 30°, 40°, 50°, 60°. Beyond, or slightly beyond, the upper annular end, the conduit portion 33 comprises a depressed section 47, which may facilitate further the bending, and closing of the milk conduit 3.

Each coupling member 20 also comprises tapering centre nipple 54, which is configured to be received by the tapering shape 46 of the milk channel 34, as can be seen in FIG. 7. The tapering centre nipple 54 preferably has an angle α of inclination, or cone angle, to the centre axis x which lies between 2° and 15°. The tapering shape 46 of the milk channel 34 forms a seal together with the tapering centre nipple 54.

A further seal is formed between the lower end surface 37' of the cover section 37 and the upper end surface 22 of the coupling member 20.

Figure 9:
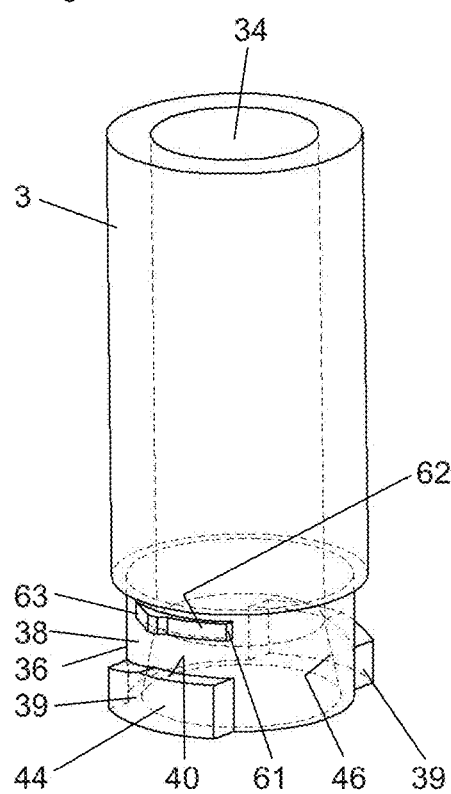
FIG. 9 discloses a perspective view of the first end portion of a milk conduit according to a second embodiment of the invention.

A second embodiment of the milk conduit 3 is disclosed in FIG. 9, which differs from the first embodiment in that the upper side 40 of projection 39 does not have any raised portion 41 for locking the outer sleeve section 36 in the turned position. Instead the outer sleeve section 36 comprises at least one locking flange 61 extending outwardly from the outer peripheral surface 38.

Figure 10:
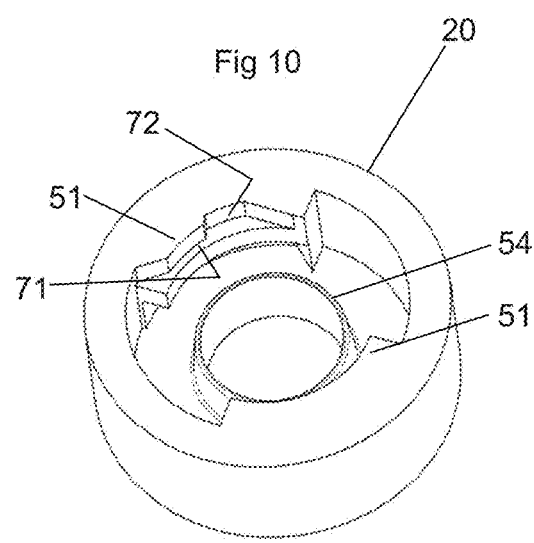
FIG. 10 discloses a coupling member for receiving the milk conduit in FIG. 9.

The locking flange 61 is provided axially beside and at a distance from one of the projections 39. The locking flange 61 has an outer surface 62 and a raised portion 63. The locking flange 61 is configured to cooperate with and be engaged by a corresponding recess 71 provided in one of the flanges 51 of the coupling member 20, see FIG. 10. Thereby, the raised portion 63 is engaged by a depression 72 of the recess 71.

The present invention is not limited to the embodiments disclosed but may be varied and modified within the scope of the claims included with the application.

It shall be noted that the number of projections 39 and cooperating flanges 51 may be another than two as disclosed in the embodiment, for instance one projection 39 and one flange 51, or three, four or even more projections 39 and cooperating flanges 51. The peripheral extension of the projections 39 has to be adapted to the number of projections 39.

The invention claimed is:

1. A milk conduit (3), comprising:
   a first end portion (31) defining a first end (31') and configured to be connected to a milk-receiving member, the first end enclosing a conduit for passage of fluid,
   wherein the first end portion (31) comprises an inner sleeve (35) section made of a first material and an outer sleeve section (36) integrally joined to the inner sleeve section (35) and made of a second material that is more rigid than the first material,
   the outer sleeve section (36) comprising an outer peripheral surface (38) and at least one projection (39) extending outwardly from the outer peripheral surface (38), said projection (39) having a peripheral extension of less than 180°, and said projection (39) configured to engage with a coupling member (20) on the milk-receiving member, and
   said projection (39) having a thickness in a lengthwise direction of the first end portion (31), the thickness of the projection defining an upper side (40) and an opposite-facing lower side, the lower side facing a terminal end of the first end portion, and the upper side (40) including an inclined ramp (42) of increasing thickness of the projection, the inclined ramp (42) terminating at a top surface (43) of a raised portion (41) of the projection.

2. The milk conduit (3) according to claim 1, wherein the peripheral extension is equal to or less than 90°.

3. The milk conduit (3) according to claim 1, wherein the peripheral extension is equal to or more than 45°.

4. The milk conduit (3) according to claim 1, wherein the milk conduit, in a rest state, extends along a centre axis (x) and wherein the top surface (43) lies in a radial plane (p) with respect to the centre axis (x).

5. The milk conduit according to claim 1, further comprising:
   a conduit portion (33) extending from the first end portion (31).

6. The milk conduit (3) according to claim 5, wherein the outer sleeve section (36) has a straight extension and extends to the conduit portion (33).

7. The milk conduit (3) according to claim 5, wherein conduit portion (33) is made of the first material.

8. The milk conduit (3) according to claim 5,
   wherein the milk conduit (3) defines a milk channel (34) extending through the first end portion (31) and the conduit portion (33), and
   wherein the milk channel (34) of the first end portion (31) has tapering shape from the first end (31') to a position beyond the projection (39), wherein the tapering shape is configured to be sealingly engaged by a correspondingly tapering centre nipple of the coupling member.

9. The milk conduit (3) according to claim 1,
   wherein the first end (31') is defined by a first end surface (45), and
   wherein a surface of the lower side of the projection (39) is located above or coinciding with the first end surface (45).

10. The milk conduit (3) according to claim 9,
    wherein the coupling member (20) comprises at least one flange (51) extending inwardly, and
    wherein the projection is configured to cooperate with the flange (51) and to be turned to a position at which the projection (39) is engaged by the flange (51).

* * * * *